Aug. 23, 1938.                O. C. WILLIS                2,127,796
                            BEARING STRUCTURE
                           Filed Nov. 17, 1937              2 Sheets-Sheet 1
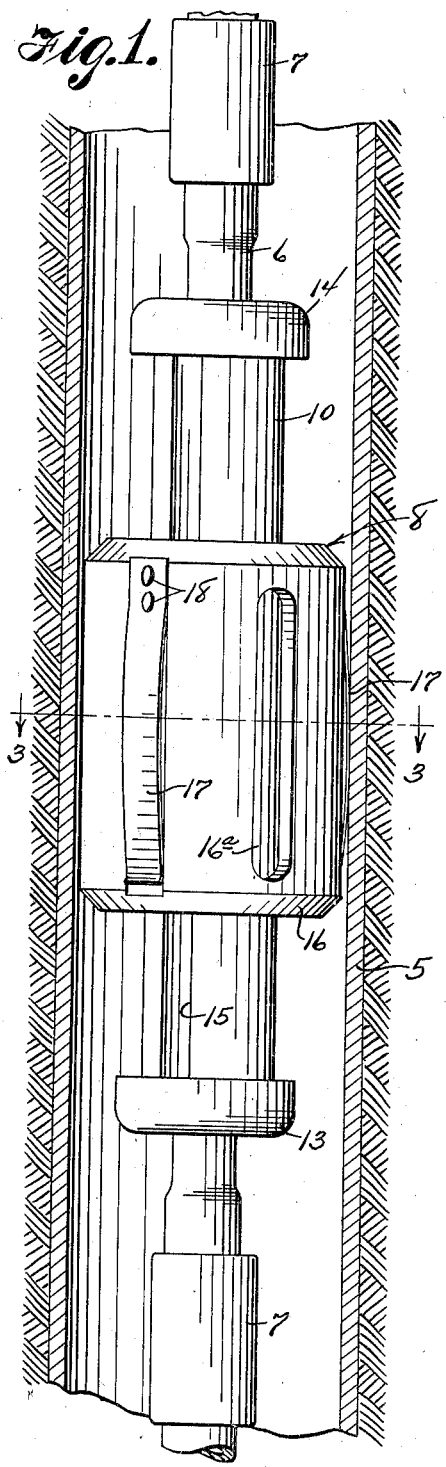
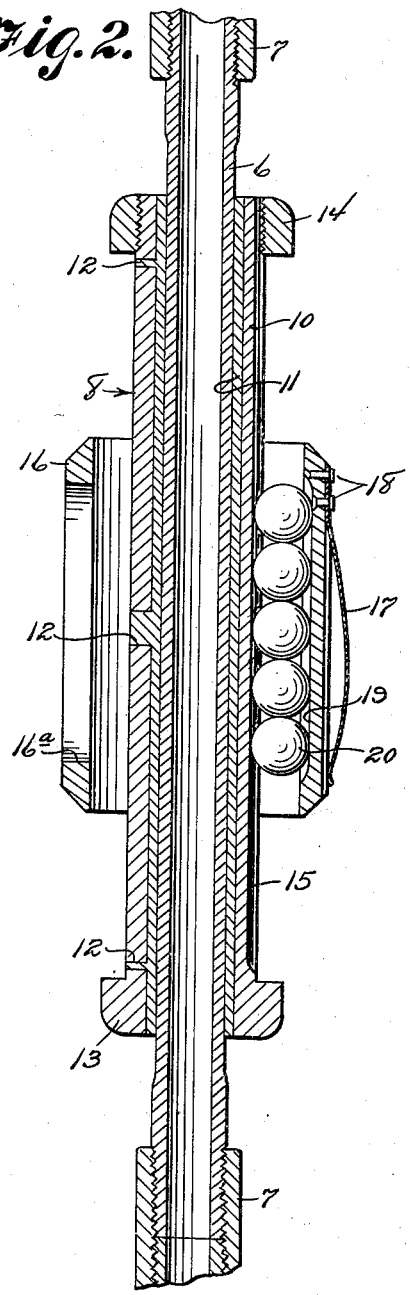
Orvis C. Willis
INVENTOR
BY Victor J. Evans & Co.
ATTORNEYS Aug. 23, 1938.　　　O. C. WILLIS　　　2,127,796
BEARING STRUCTURE
Filed Nov. 17, 1937　　　2 Sheets-Sheet 2
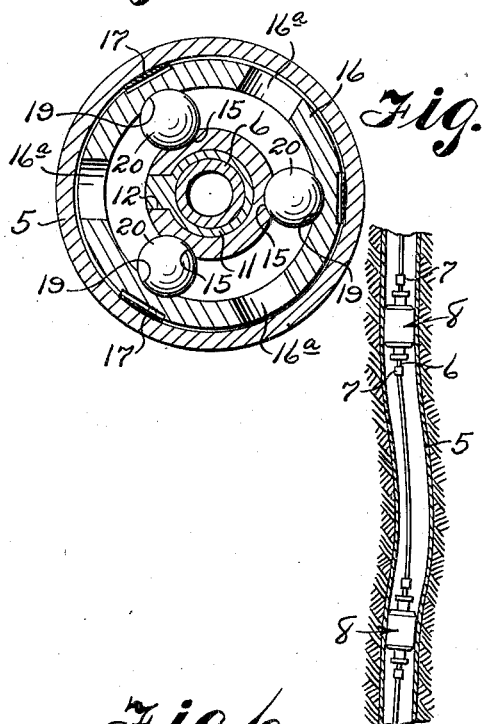
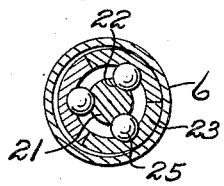
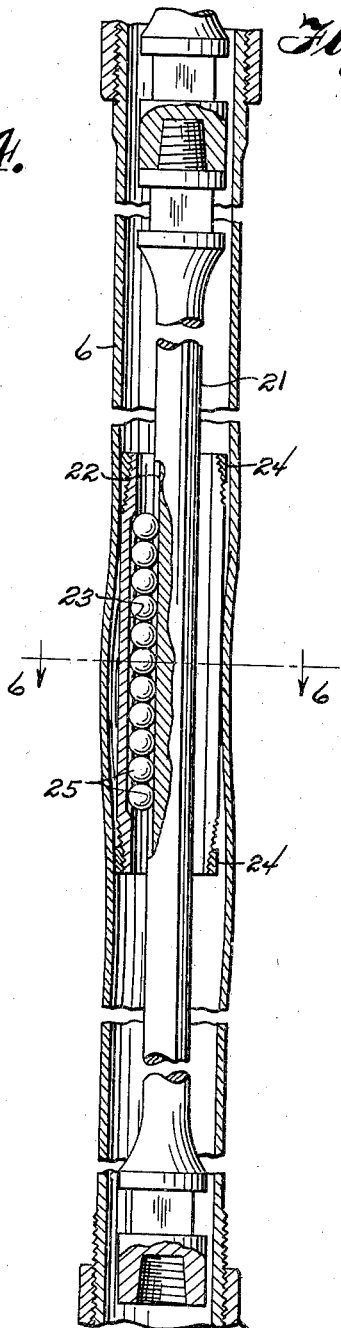
Orvis C. Willis INVENTOR
BY Victor J. Evans & Co.
ATTORNEYS Patented Aug. 23, 1938

2,127,796

UNITED STATES PATENT OFFICE 2,127,796

BEARING STRUCTURE

Orvis C. Willis, Rodessa, La.

Application November 17, 1937, Serial No. 175,109

1 Claim. (Cl. 308—6)

My invention relates to bearing structures and more particularly to bearing structures utilized in connection with the operation of oil wells and the like.

It has been the common practice in oil wells or the like, which have casings slightly inflected or bent intermediate of the ends thereof, to equip the tubes with bearings for maintaining the tubes and casings in spaced relation to prevent the casings and tubes from engaging each other and the resultant wear to the parts due to the reciprocation of the tube. Furthermore, it has also been the practice to equip the sucker rod extending through the tube with a bearing to maintain the rod in spaced relation from the tube for the same reasons.

Bearings heretofore used for this purpose have presented many difficulties and disadvantages, for instance, when used in wells of the self-flowing or intermittent flowing type, they restricted the flow of the gas or oil because the bearings blocked or restricted the passage between the tube and casing and/or the sucker rod and tube as the case happened to be. Furthermore, during the pumping operation of a well, considerable gas, formed from the oil, escaped between the tube and casing and in using bearings, for spacing the tube from the casing, the passage was restricted, thereby reducing to a considerable degree the amount of gas flowing therebetween. In thus restricting the flow of gas, pressure was built up within the bottom of the well and prevented the oil from flowing through the perforated liner into the well.

Ordinary types of bearings used in wells located in localities in which the water has a saline content became encrusted or crystallized due to the action of the water and this encrusting of the parts served to effectively block the passage between the outer periphery of the bearing and inner periphery of the casing, thereby preventing not only the flow of gas and oil therethrough but the injection into the casing of a suitable solution for counteracting the effect of the water and thereby eliminating crystalization on the parts.

One of the principal objects of my invention is to provide a bearing structure constructed in a manner to permit a maximum amount of gas to escape or oil to flow from the well and thus reduce to a minimum the possibility of blocking the flow of oil through the liner into the well.

Another object of my invention is to provide a bearing structure so constructed as to permit a maximum amount of chemical solution or the like to be readily injected into the well whereby to clean, lubricate and prevent encrusting of the parts.

A further object of my invention is to provide a bearing structure of the above described character equipped with means for reducing to a minimum friction and which may be readily secured between the moving parts to space the same from each other to prevent relative wear.

Still another object of my invention is to provide a device of the above described character which is easy of attachment, simple in construction, durable in use, efficient in operation and economical in manufacture.

Other objects and advantages will be apparent from the following description, appended claim and annexed drawings.

Referring to the drawings wherein like reference characters designate like parts throughout the several views:

Fig. 1 is a vertical section through a portion of a well casing illustrating my invention therein.

Fig. 2 is a vertical section of a well tube illustrating my invention applied thereto.

Fig. 3 is a sectional view taken on the line 3—3 of Figure 1.

Fig. 4 is a diagrammatic view illustrating a pair of my bearing structures secured in operating position within a section of an inflected well casing.

Fig. 5 is a vertical section of a modified form of my bearing structure illustrating the same attached to a sucker rod for maintaining said rod in spaced relation relative to a well tube.

Fig. 6 is a sectional view taken on the line 6—6 of Figure 5.

In teaching my invention there is illustrated in Figures 1 to 4 of the drawings a section of a well casing 5 in which is mounted for reciprocation therein a sectional well tube 6 having couplings 7 connecting the sections together. The well casing and tube are of typical constructions adapted for use in connection with the operation of oil wells and the like.

My invention, which comprises a bearing structure or device 8, is adapted to be positioned within the casing and coacts with the casing and tube for maintaining the tube in spaced relation from the casing to prevent engagement of the tube or couplings carried thereby with the casing, thereby eliminating wear on the tube, couplings or casing. My device is primarily used in connection with casings which are inflected or bent intermediate of the ends thereof and which would ordinarily, due to such inflection, cause the tube or couplings carried thereby to engage the inner periphery of the casing with resultant wear on the parts, it being understood that a pair of my devices 8 may be mounted within the casing adjacent each end of the inflected section. One of such devices coacts with the other to maintain the tube in spaced relation within the particular inflected section.

My bearing structure or device 8 comprises an elongated bearing sleeve 10 fixed on one section of the tube 6 by means of a liner 11 formed by heated metal being poured between said sleeve and tube. Said bearing sleeve is formed with a plurality of apertures 12 intermediate of the ends thereof serving as vents for said metal. One end of said sleeve is fashioned with a flange 13 forming a stop shoulder for a purpose hereinafter set forth and the opposite end threaded for receiving thereon a nut 14 forming a similar stop shoulder for a like purpose hereinafter set forth. The outer face of the sleeve 10 is formed with a plurality of longitudinally extending grooves 15, the same being illustrated as three in number although it is to be distinctly understood that any desired number may be formed in said face.

Mounted about the sleeve 10 is a collar 16 having secured on the outer face thereof a plurality of leaf springs 17 by means of rivets 18 or the like. Said leaf springs engage the inner periphery of the casing 5 and serve to maintain said sleeve in a normally fixed position relative to the casing and adjacent an inflected section thereof as heretofore described. The inner face or periphery of the collar 16 is fashioned with a plurality of longitudinally extending grooves 19 intermediate of the ends thereof and in registery with the grooves 15 formed in the outer periphery of the sleeve 10. The grooves 19 are of a corresponding number to those formed in the sleeve 10.

Interposed between the sleeve 10 and collar 16 and operating within the grooves 15 and 19 are a plurality of members or ball bearings 20 for effecting bearing connection between the sleeve and collar and coacting with said sleeve and collar to form a plurality of longitudinally extending passages between the sleeve and collar for oil or gas to pass through the bearing structure.

The ball bearings are of a sufficient size to space the opposed peripheries or faces of the sleeve and collar a sufficient distance apart to permit a free flow of the oil or liquid through the passages thus formed and also to permit the use of a collar having a greater outer diameter for connection in close proximity to the casing. By utilizing a collar of a large outside diameter aforementioned, the same serves to effect a more substantial centralization of the tube within the casing than would be obtainable with a collar of a lesser diameter. Furthermore, by the use of a collar having a large outside diameter, the inner diameter of said collar is likewise larger, thus permitting larger sized ball bearings and consequently larger longitudinally extending passages for the free flow of the oil or gas.

It is to be understood that the passages formed between the sleeve and collar while permitting oil and gas to flow therethrough from within the well also permit the injection of solutions into the well for cleaning and lubricating the relatively moving parts.

In assembling, the sleeve 10 is positioned about a section of the tube 6 and heated metal is introduced therebetween to form the liner 11, the apertures 12 serving as vents therefor. Upon formation of the liner 11 the collar 16 is inserted over the threaded end of the sleeve and the ball bearings inserted within the grooves 15 and 19, the collar being gradually fed towards the opposite end of the sleeve during the insertion of the ball bearings. Upon completion of the insertion of the ball bearings, the nut is threaded onto the threaded end of the sleeve and thereby serves to limit the relative movement of the sleeve and collar, through the medium of the ball bearings, in one direction and the flange 13 serves to limit such movement in the opposite direction.

In Figures 5 and 6 of the drawings, there is illustrated a modified form of bearing structure wherein the sucker rod 21 within the tube 6 is formed with a plurality of longitudinally extending grooves 22. A split collar 23 is mounted about the sucker rod and is fashioned on the outer face thereof with grooves registering with the grooves 22 on the sucker rod. Each end of the collar 23 is threadedly tapered to receive nuts 24 thereon whereby to maintain said collar about the sucker rod and a plurality of ball bearings 25 are mounted within the grooves of the sucker rod and collar 23.

In use, the collar is secured in frictional engagement to the inner periphery of the tube 6 due to the inflection of the tube and thereby serves to maintain the sucker rod in spaced relation from said tube.

It is to be understood that the sleeve, collar and other associated parts are to be constructed of case hardened metal or other suitable wear resisting material and that the same may be of such a nature as to resist acid solutions and the like.

If desired, the collar may be formed with longitudinally extending slots 16a to lessen the weight thereof.

What I claim is:

A device of the character described, comprising, in combination, a well casing, a well tube operable within said casing, a sleeve fixed to said tube and formed with longitudinally extending grooves, a collar about said sleeve and formed with longitudinally extending grooves adapted for alignment with said first mentioned grooves, springs carried by said collar and yieldably connecting said collar to said casing whereby to permit reciprocation of said sleeve relative to said collar, and a plurality of ball bearings within said grooves for effecting a bearing connection between said sleeve and said collar, said ball bearings coacting with said sleeve and said collar to space the opposed peripheries of said sleeve and said collar a sufficient distance apart to form longitudinally extending passages between said ball bearings whereby to permit a free flow of liquid or the like through said passages and enable said collar to be connected in close proximity to said casing for effecting a centralization of said tube within said casing.

ORVIS C. WILLIS.